May 24, 1960  F. B. MILLER ET AL  2,937,657
FIRE VALVE AND APPARATUS FOR REPLACING PARTS THEREOF
Filed Oct. 11, 1955  4 Sheets-Sheet 1

INVENTORS:
Frank B. Miller,
Cecil R. Foltz,
John J. Smith,
BY Cushman, Darby & Cushman
ATTORNEYS.

May 24, 1960  F. B. MILLER ET AL  2,937,657
FIRE VALVE AND APPARATUS FOR REPLACING PARTS THEREOF
Filed Oct. 11, 1955  4 Sheets-Sheet 2

INVENTORS:
Frank B. Miller,
Cecil R. Foltz, and
John J. Smith,
BY Cushman, Darby & Cushman
ATTORNEYS.

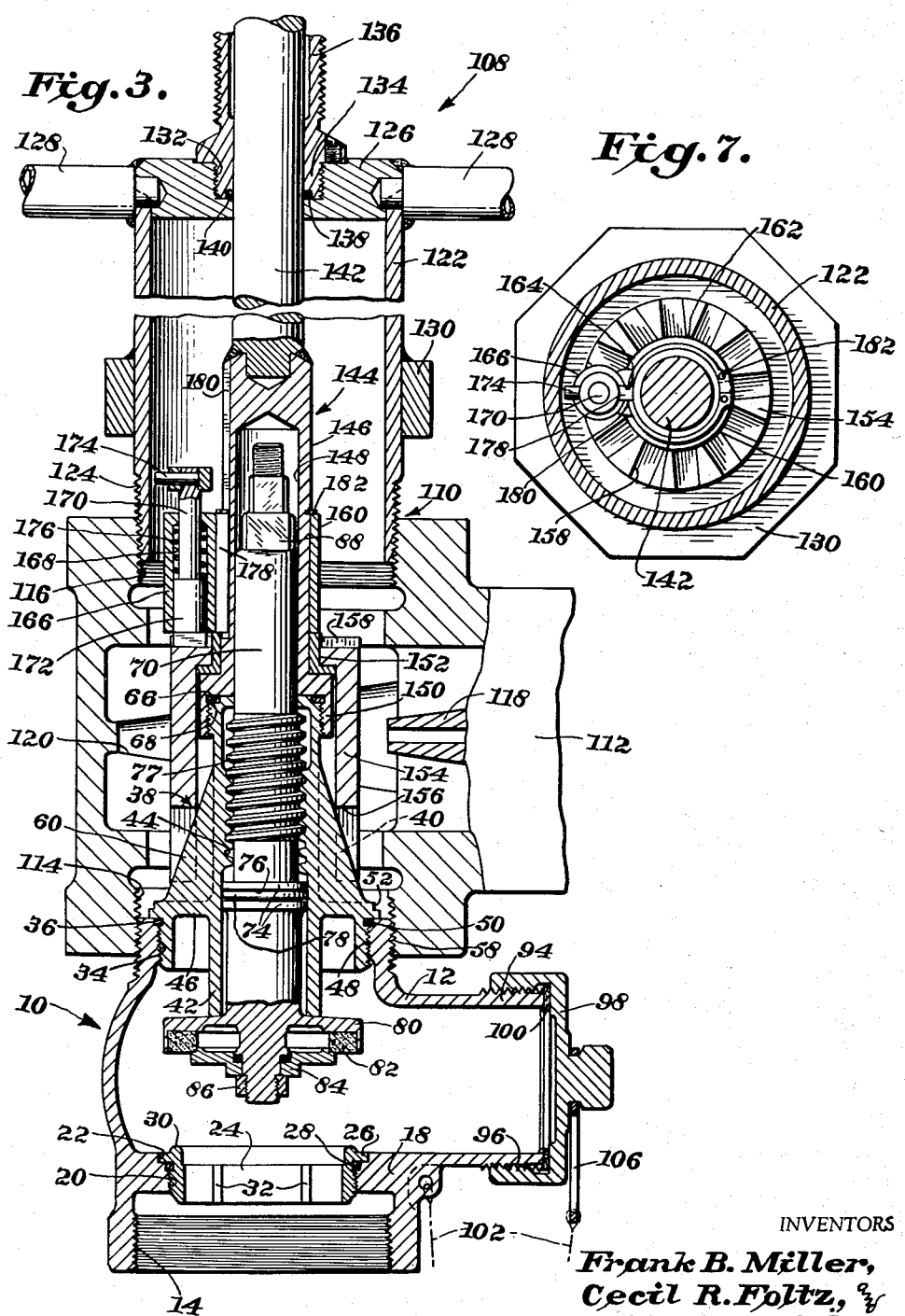

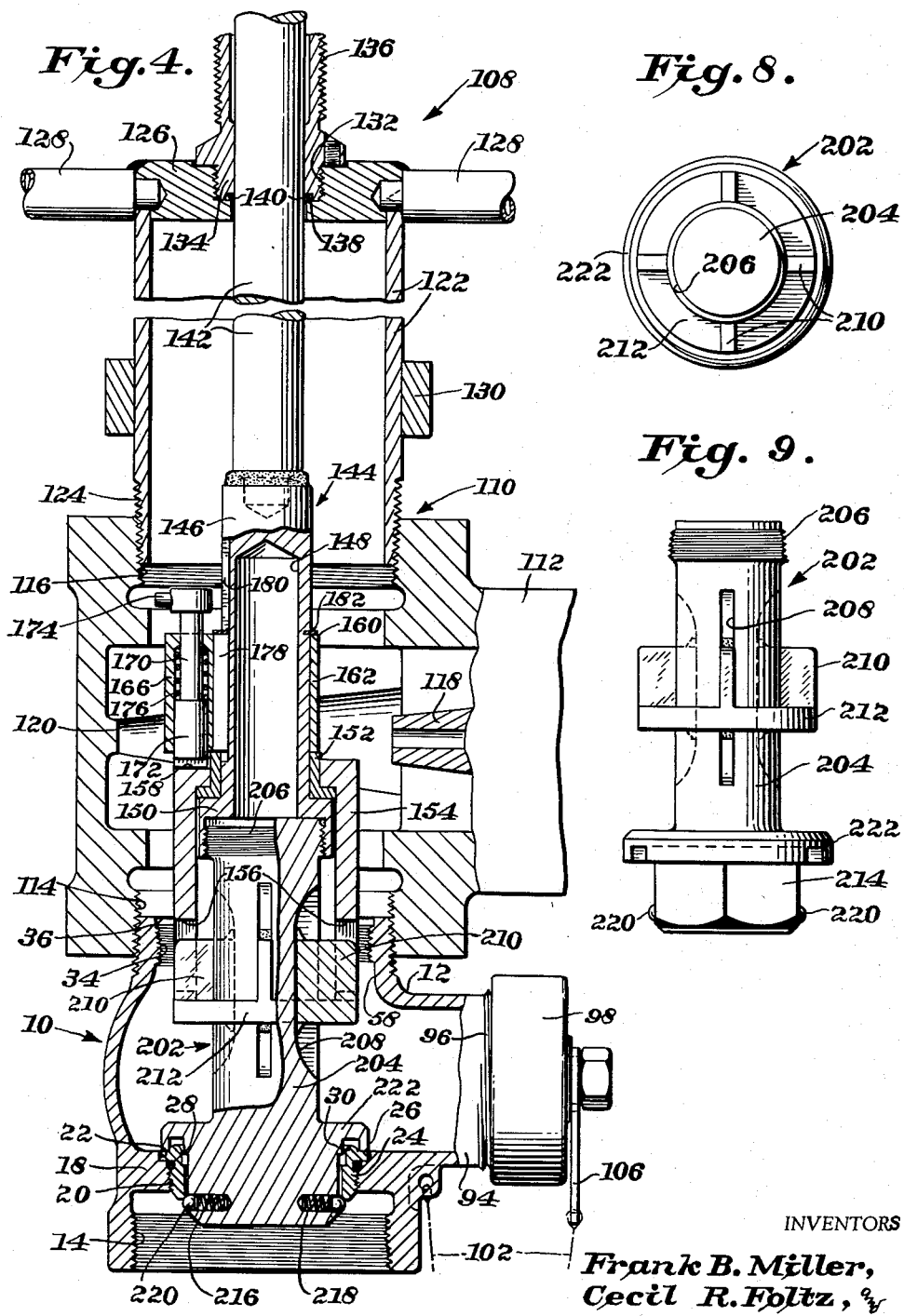

United States Patent Office 2,937,657
Patented May 24, 1960

2,937,657

FIRE VALVE AND APPARATUS FOR REPLACING PARTS THEREOF

Frank B. Miller, Jacksonville, Fla., Cecil R. Foltz, Alhambra, Calif., and John J. Smith, Decatur, Ill., assignors to Mueller Co., Decatur, Ill., a corporation of Illinois Filed Oct. 11, 1955, Ser. No. 539,808

20 Claims. (Cl. 137—328)

This invention relates to fire valves and more particularly to a novel fire valve construction, apparatus, and method for removing and replacing the bonnet assembly and seat of the valve.

In the normal installation of a series of fire valves, such as might be utilized in a building installation, the individual valves are connected in a line and usually, a single master valve is provided for shutting off the flow of water pressure to all the individual fire valves at once. Thus, where repairs are required on a single fire valve, it has been necessary in the past to shut off the pressure of the entire system in order to repair the single valve, since no effective means are available to repair a fire valve while connected to a source of fluid pressure. It can be seen that when it becomes necessary to shut down an entire fire-protection system to repair one fire valve thereof, the fact that the source of water pressure is not immediately available at this time constitutes a serious disadvantage which may lead to disastrous results by fire.

Accordingly, it is an object of the present invention to provide an improved fire valve which is constructed and arranged to cooperate with a maintenance machine operable to permit repair of the fire valve while the latter is connected to a source of fluid pressure, and thus overcome the disadvantages mentioned above.

A further object of the present invention is the provision of a novel fire valve having a bonnet assembly which is adapted to be removed and replaced while the valve is connected to a source of pressure and a renewable valve seat which is adapted to be removed and replaced along with the bonnet assembly.

A still further object of the present invention is the provision of a fire valve maintenance machine which is adapted to be attached to the body or casing of a fire valve in fluid-tight engagement therewith and in surrounding relation to the bonnet assembly thereof so as to permit removal and replacement of the latter while the fire valve is connected to a source of fluid pressure.

A still further object of the present invention is the provision of a fire valve maintenance machine of the type described having an improved bonnet removing and replacing tool which is operable to positively engage the bonnet for lifting purposes at one point, and to engage the bonnet at a second point for turning purposes so that the latter may be first loosened from its threaded engagement within the fire valve and then lifted therefrom.

A still further object of the present invention is the provision of a fire valve maintenance machine of the type described having a novel valve seat removing and replacing tool which cooperates with the bonnet removing and replacing tool so as to permit the valve seat of the fire valve to be removed and replaced after the bonnet of the valve has been removed.

Still another object of the present invention is the provision of a novel fire valve which is simple in construction, easy to operate, and economical to manufacture and maintain.

A still further object of the present invention is the provision of a novel fire valve maintenance machine of the type described which is simple in operation, simple in construction, easy to operate, and economical to manufacture and maintain.

These and other objects of the present invention will become more apparent during the course of the following detailed description and appended claims.

The invention may best be understood with reference to the accompanying drawings wherein an illustrative embodiment is shown.

In the drawings:

Figure 3 is a fragmentary, vertical, sectional view of the maintenance machine and fire valve in the position illustrated in Figure 2;

Figure 4 is a view similar to Figure 3 showing the fire valve with the bonnet assembly thereof removed and with the machine in its valve seat removing position;

Figure 7 is a cross-sectional view taken along the line 7—7 of Figure 2;

Figure 8 is a top plan view of the valve seat removing and replacing tool; and

Figure 9 is an elevational view of the tool shown in Figure 8.

Figure 1:
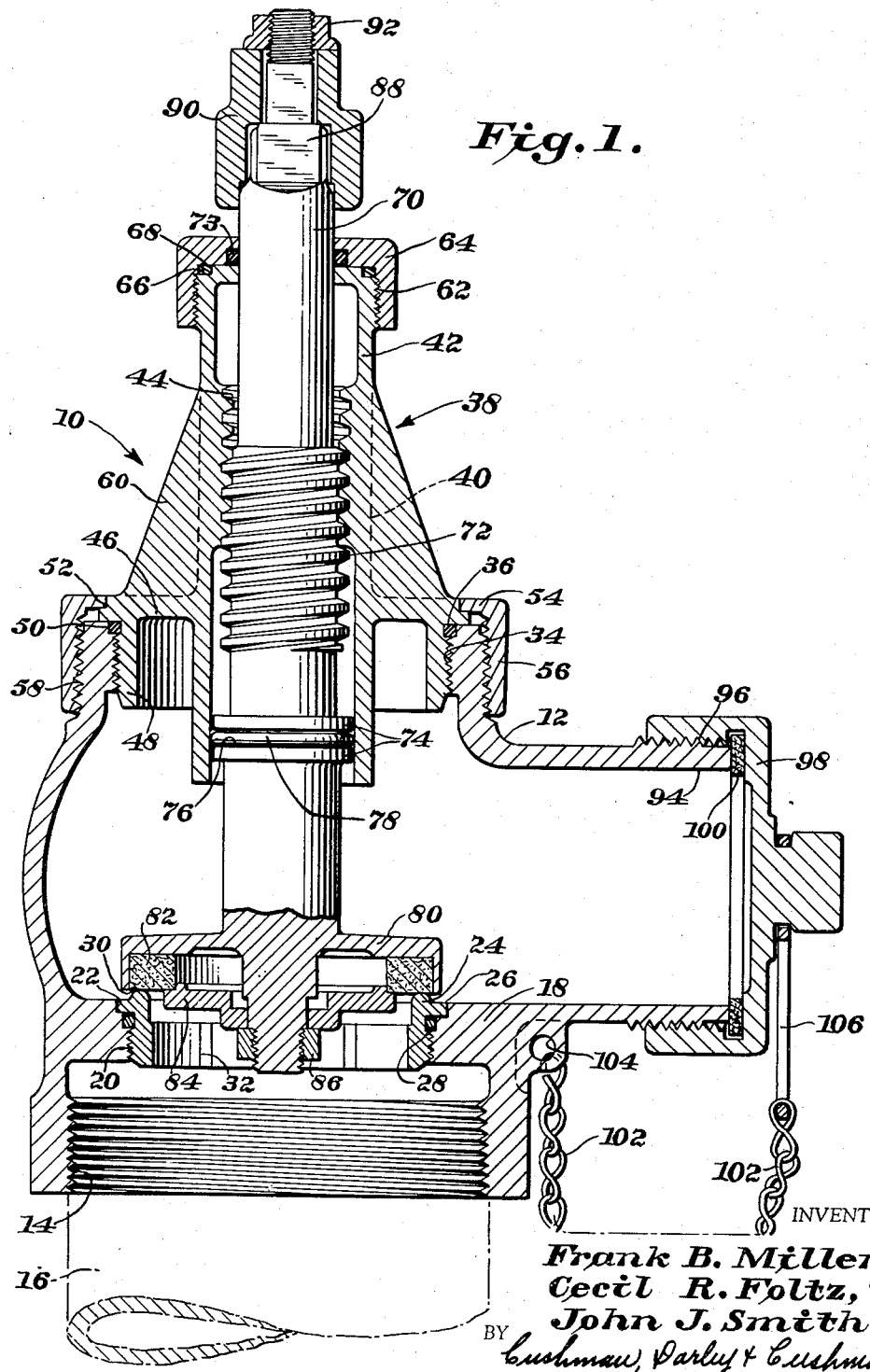
Figure 1 is a vertical sectional view of an angle fire valve embodying the principles of the present invention.

Referring now more particularly to Figure 1 of the drawings, there is shown therein an angle fire valve, generally indicated at 10, which embodies the principles of the present invention. The fire valve comprises a valve casing or body 12 having an internally threaded inlet 14 adapted to be threadedly connected to the upper end of a stand pipe or conduit 16 of a fire protection system.

Disposed just above the inlet 14 of the valve body is an inwardly directed annular flange 18 defining an opening 20 which is concentric with the inlet 14 and has its lower end internally threaded and its upper end provided with an annular recess 22. The lower end of the opening is adapted to threadedly receive the lower threaded end of a ring-shaped valve seat insert 24 having an annular flange 26 extending radially outwardly from the upper end thereof; which flange is adapted to seat within the annular recess 22. An O-ring sealing member 28 is preferably disposed between the flange 26 of the valve seat insert and the lower threaded portion thereof, and cooperates with the upper end of the opening 20 to provide a pressure tight seal between the valve seat insert and the opening 20. The upper surface of the valve seat insert is provided with an annular bead seat 30, and the interior surface of the insert is provided with a plurality of annularly spaced V-shaped notches 32 which are adapted to cooperate with a valve seat removing and replacing tool as will hereinafter be more fully explained.

Formed in the valve body in opposed relation to the valve seat insert 24, in concentric relation to the opening 20 and the inlet 14, is an internally threaded bonnet receiving opening 34 having an annular recess 36 formed in its upper end. Threadedly mounted within the opening 34 is a bonnet assembly, generally indicated at 38, which includes a bonnet casting 40 having a vertical cylindrical portion 42 provided with interior threads 44 intermediate its ends. Extending radially outwardly from the cylindrical portion 42, at a position spaced above the lower end thereof, is an annular horizontal flange 46, the outer periphery of which is adapted to seat upon the upper end of the valve body surrounding the opening 34. An annular vertical flange or skirt 48 extends downwardly from the flange 46 along a line spaced inwardly from the outer edge thereof and has its outer surface threaded to cooperate with the threads of the opening 34. An O-ring sealing member 50 is disposed between the outer end of the flange 46 and the threaded portion of the flange 48 in sealing engagement with the upper end of the opening 34.

The upper outer periphery of the flange 46 is provided with an annular recess 52 to receive an inwardly directed radial flange 54 of a thread protector ring 56. Ring 56 is threadedly engaged with external threads 58 formed in the valve body 12 in surrounding relation to the opening 34. These threads 58 constitute a means for engaging the maintenance machine of the present invention as will hereinafter be more fully described.

Extending upwardly between the horizontal flange 46 and the cylindrical portion 42 of the bonnet is a plurality of circumferentially spaced triangularly shaped ribs 60 which add strength to the bonnet construction. The upper end portion of the cylindrical portion 42 is exteriorly threaded, as at 62, to threadedly receive a cap 64. The ribs 60 and threads 62 constitute a means for engaging the bonnet removing and replacing tool of the present maintenance machine, as will appear more fully hereinafter. Preferably, the upper edge of the cylindrical portion 42 is provided with an annular groove 66 within which an O-ring sealing member 68 is received so as to provide a seal between the upper end of the bonnet and the cap.

The bonnet assembly 38 further includes a valve stem 70 which extends through suitable apertures formed in the cap 64 and the upper end of the bonnet and is provided with centrally disposed threads 72 which cooperate with the threads 44 of the bonnet. A counterbore recess in the cap receives an O-ring sealing member 73 which provides a dust-tight seal between the upper end of the bonnet and the valve stem. Disposed on the valve stem 70 in spaced relation below the threads 72 is a pair of vertically spaced annular shoulders 74 defining therebetween an annular recess 76 for the reception of an O-ring sealing member 78. O-ring 78 cooperates with the inner surface of the cylindrical portion 42 of the bonnet so as to provide a pressure-tight seal between the valve stem and the bonnet.

The lower end of the valve stem 70 is provided with an enlarged washer receiving portion 80, of generally inverted cup shaped configuration, which is adapted to receive a valve member 82 preferably in the form of a replaceable ring washer. The valve member 82 is removably positioned within the portion 80 by means of a circular retainer member 84 having its outer periphery shaped to cooperate with the ring washer and provided with a central aperture through which the projecting lower end of the valve stem extends. A suitable fastening element, such as nut 86, is threadedly engaged on the projecting end of the valve stem so as to secure the retainer member in engagement with the valve member 82.

The upper end of the valve stem 70 includes a portion 88 of octagonal cross-sectional configuration for receiving a conventional pentagonal stem top 90 which may be secured in position by any suitable means, such as stem nut 92.

In the usual manner, the valve body 12 also includes an outlet hub 94 which extends perpendicularly to the inlet 14 and which is exteriorly threaded, as at 96, to receive a conventional outlet cover 98. If desired, the outlet cover may be provided with a ring gasket 100 which cooperates with the end of the outlet hub to provide a pressure-tight seal between the outlet and the cover. The cover 98 may be fastened to the valve body against loss or misplacement by means of a chain 102 having one end thereof connected to an eye 104 formed on the valve body and the opposite end thereof connected to a link 106 secured to the cover 98.

As was briefly mentioned above, the angle fire valve 10 just described, is particularly constructed and arranged so as to cooperate with a maintenance machine or mechanism which is operable to remove and replace the bonnet assembly 38 and the valve seat insert 24 thereof while the valve is under pressure. This fire valve maintenance machine is generally indicated at 108 and will now be described.

Figure 2:
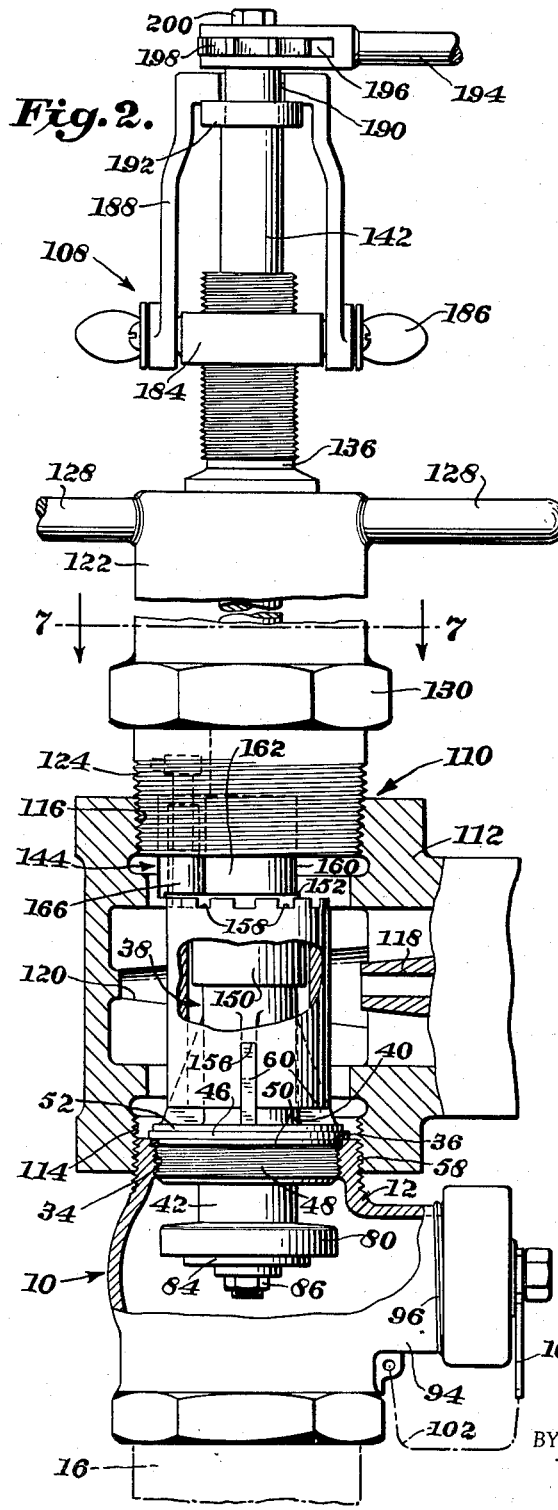
Figure 2 is an elevational view partly in section showing the maintenance machine in its initial position of engagement with the fire valve.
Figure 5:
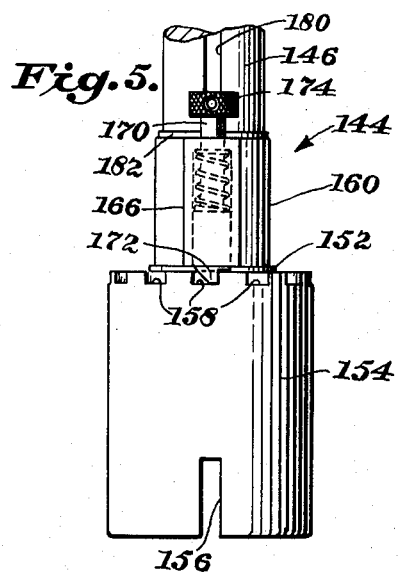
Figure 5 is an enlarged, fragmentary, elevational view showing the bonnet removing tool of the maintenance machine.
Figure 6:
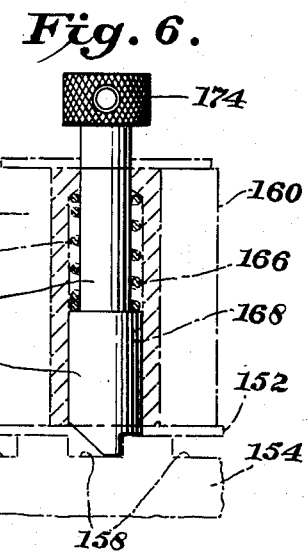
Figure 6 is a vertical sectional view showing the ratchet detent mechanism of the bonnet removing tool.

As best shown in Figure 2, the machine 108 comprises a barrel or housing 110 composed of upper and lower sections. The lower section of the housing is formed by a gate valve 112 which may be of conventional construction. Briefly, this valve includes a casing having an interiorly threaded inlet 114 and an interiorly threaded outlet 116, and a valve gate 118 which is movable into and out of engagement with a valve seat 120 formed between the inlet and outlet. It will be understood that a suitable mechanism (not shown) is provided for actuating the gate 118 in a conventional manner.

The upper section of the housing 110 includes a cylindrical member 122 which preferably is composed of a pipe or tube having its lower end threaded, as at 124, for threaded engagement within the outlet 116 of the gate valve. The upper end of the cylindrical member 122 is closed by means of a circular centrally apertured plate 126 secured thereto, as by welding or the like. Extending outwardly from the plate 126 is a pair of diametrically opposed handles 128 for the purpose of initially engaging the cylindrical member within the threaded outlet of the gate valve. If desired, a wrench ring 130 may be rigidly secured, as by welding or the like, to the outer periphery of the cylindrical member 122 for the purpose of effecting the final tightening of the cylindrical member within the threaded outlet 116 of the gate valve 112.

Extending downwardly from the upper end of the plate 126 is an interiorly threaded counter bore 132 which receives the exteriorly threaded lower end 134 of a cylindrical sleeve 136. The lower inner peripheral edge of the sleeve 136 is preferably provided with an annular groove 138 for receiving an O-ring sealing member 140 so as to provide a pressure-tight seal between the sleeve 136, plate 126, and a bar 142 which extends through the sleeve and cylindrical member 122 for rotary and rectilinear motion with respect thereto.

The lower end of the bar 142 has rigidly secured thereto, as by welding or the like, the upper end of a bonnet removing and replacing tool, generally indicated at 144. The tool 144 comprises an elongated member 146 having a bore 148 extending upwardly from the lower end thereof which is adapted to receive the upper end of the valve stem when the tool is in operation. Formed on the lower end of the member 146 is a downwardly facing interiorly threaded socket 150 which is adapted to engage the upper bonnet threads 62, in operation, and which constitutes a means for lifting the bonnet assembly from the valve body. A bushing 152 is disposed on the member 146 in abutting relation to the upper end of the socket 150, and a shell or forked member 154 is rotatably mounted on the bushing 152. This forked member includes a cylindrical wall having circumferentially spaced slots or openings 156 extending upwardly from the lower end thereof which, in operation, are adapted to engage the ribs 60 of the bonnet and constitute a means for turning the bonnet.

The upper inturned end of the forked member 154 is provided with a series of circumferentially spaced notches 158 which constitutes a part of a ratchet or clutch means operable to permit relative rotational movement between forked member 154 and socket 150 in one direction only. Surrounding the member 146 above bushing 152 is a sleeve assembly 160 composed of a tube 162 provided with a vertical cut 164 extending longitudinally through the wall thereof. Secured to the tube 162 adjacent the cut 164 thereof is a bar element 166 having a central bore 168 extending upwardly from the lower end thereof. A ratchet dog or detent 170 is slidably and rotatably mounted within the bore 168 and has a lower head 172 provided with a tapered, notch-engaging lower surface. The upper end of the detent extends through the end wall of the rod element 166 and has an indicating pin 174 secured thereto. A coil spring 176 is disposed within the central bore 168 and has its upper end in engagement with the upper end wall of the rod element 166 and its lower end in engagement wtih the detent head 172 so as to resiliently urge the latter downwardly. The sleeve assembly 160 is rigidly positioned on the member 146 by means of a key 178 extending through the cut 164 of the tube and a suitable keyway 180 formed in the outer periphery of the member 146. If desired, a retaining ring 182 may be engaged within the outer periphery of the member 146, just above the upper edge of the tube 162 and key 178.

The bar 142 together with the tool 144 rigidly secured to the lower end thereof is rotatably and rectilinearly moved within the housing by a somewhat conventional means which will now be described. Threadedly mounted on the exterior surface of the sleeve 136 is a feed nut 184 having a plurality of circumferentially spaced handles 186 extending radially outwardly therefrom. A generally U-shaped yoke 188 has the free ends of its legs pivotally mounted in diametrically opposed relation to the outer periphery of the feed nut 184 and has its bight portion notched as at 190 to receive the upper end of the bar 142. A collar 192 is rigidly secured to the bar 142 below the bight portion of the yoke and disposed above this bight portion is a conventional ratchet handle 194 having a reversible detent 196 adapted to cooperate with a ratchet wheel 198 rigidly secured to the upper end of the bar, as by nut 200.

For the purpose of removing and replacing the valve seat insert 24 of the fire valve, a valve seat removing and replacing tool 202 is provided which is adapted to cooperate with the bonnet removing and replacing tool 144. As best shown in Figures 8 and 9, the tool 202 comprises a body 204 of substantial cylindrical configuration having exterior threads 206 provided at its upper end for engagement within the interiorly threaded socket 150 of the tool 144. Formed in the central portion of the body 204 are a series of circumferentially spaced vertical grooves 208 within which a corresponding series of ribs 210 are rigidly secured, as by welding or the like. The lower ends of the ribs 210 may be interconnected by means of an apertured disk 212 welded or otherwise secured to the periphery of the body and the lower end of the ribs. Formed on the lower end of the body 204 is a head or wrench portion 214 which is hexagonal in cross section and adapted to seat within the notches 32 formed in the interior of the valve seat. A series of radially extending bores 216 are formed in circumferentially spaced relation in the lower end of the wrench portion 214 and these bores receive coil springs 218 which resiliently urge balls 220 outwardly of the respective bores. The upper end of the wrench portion 214 is provided with a grooved, annular flange 222 which is adapted to receive the valve seat bead 30.

From the above, the operation of the angle fire valve 10 is believed to be apparent. Briefly, when the inlet 14 is connected to a conduit containing a source of fluid pressure, this pressure is closed off by means of the valve member 82 engaging seat bead 30. When it is desired to utilize the fire valve, cover 98 is removed and a suitable hose connection (not shown) attached to the outlet of the valve body. The valve stem 70 is then turned by engaging a suitable wrench (not shown) on the pentagon-shaped stem top 90 so as to raise the valve stem and, hence, the valve member therewith. To close the valve, the valve stem is turned in the opposite direction. It will be noted that the O-ring sealing member 78 provides an effective means for sealing off the fluid pressure within the valve body when the valve stem is out of its closed position. The thread protector 56 and cap 64 serve mainly to protect threads 58 and 62, respectively, from being damaged, such threads being necessary in the proper functioning of the maintenance machine.

The following procedure is carried out in order to remove the bonnet assembly from the valve body. As a precautionary measure, the outlet cover is initially checked for tightness to insure that no leakage will result at this point during the subsequent operations of the machine. The valve stem is then turned into its uppermost raised position so that the valve member is opened to its greatest extent. Stem nut 92, pentagonal stem top 90, and thread protector 56 are then removed from their respective positions of engagement preparatory to the attachment of the maintenance machine to the valve body.

With the threads 58 thus exposed, the inlet of the gate valve 112, in an open condition, is lowered over the bonnet until the interior threads thereof engage the threads 58. The gate valve is then turned until the same is in pressure-tight engagement with the valve body.

The upper section of the machine housing which carries the bar 142 and the tool 144 associated therewith is then adjusted for the removal of the bonnet by turning the ratchet detent pin 174 until the same extends outwardly, thus positioning the wedge face thereof so that clockwise movement of the bar, as viewed in Figure 7, will permit the ratchet detent to ride over the projections formed between the notches 158 and conversely permitting the detent to engage within the notches 158 to move the forked member with the bar upon counter-clockwise movement of the latter.

With the upper section of the machine in this condition, and with the bar raised to its uppermost position within the cylindrical member 122, the lower threaded end 124 thereof is engaged within the outlet of the gate valve 112. The bar and associated tool are then lowered with a substantial rectilinear motion until the slots 156 in the lower end of the forked member 154 engage the ribs 60 of the bonnet. It will be noted that the initial engagement of the slots and ribs is at a position spaced vertically from the final position as illustrated in Figure 3 due to the fact that the socket 150 has not been threaded onto threads 62 of the bonnet. With the tool 144 in this position, the ratchet handle 194 is actuated to rotate the bar in a clockwise direction, as viewed in Figure 7, so as to effect the engagement of the threaded socket 150 onto the upper threads 62 of the bonnet. It will be noted that the position of the ratchet detent 172 enables the socket 150 to be rotated in this direction relative to the forked member 154, which must be held rotationally stationary due to the engagement of slots 156 with bonnet ribs 60.

When the socket 150 has been tightly engaged on the upper end of the bonnet, the detent 196 of the ratchet handle 194 is reversed and the latter is actuated to impart a counter-clockwise rotation to the bar, and this rotation is transmitted to the forked member 154 by virtue of the position of the ratchet detent 166. In this manner, the forked member 154 serves to turn the bonnet out of threaded engagement within the opening 34 and the engagement of the socket 150 on the upper end of the bonnet provides a means for lifting the bonnet upwardly after the same has been turned free of its threaded connection. It will be noted that during the counter-clockwise turning of the bar 142 to unseat the bonnet 40, both ratchet handle 194 and feed nut 184 and yoke 188 are utilized. Thus, the engagement of yoke 188 with collar 192 serves to restrain the movement of the bonnet assembly at the time the latter is freed from its threaded connection, thus preventing a blowout of the same. The bonnet assembly is then moved upwardly by actuation of the feed nut until the same is disposed above the gate 118 of the gate valve. The gate 118 is then actuated into its closed position so as to close off the pressure existing within the valve body.

The upper section of the housing is then unscrewed from its connection with the gate valve and removed therefrom along with the bonnet assembly. Ratchet detent pin 174 is then reversed permitting counter-clockwise rotation of the bar, as viewed from above, to turn the socket 150 relative to the bonnet assembly and thus release the bonnet assembly from the tool.

It will be understood that in maintaining angle fire valves of the type described, it will be necessary in many cases to replace the valve member or washer 82 only, and in such cases, the removal of the worn washer 82 can be effected with the bonnet stem attached to the tool merely by removing nut 86 and retainer 84 and then replacing the washer with a new one. The retainer nut may then be reset into position and the replacement of the bonnet assembly into the valve body is accomplished by reversing the procedure outlined above.

When it is desired to replace the valve seat insert 24, the bonnet assembly is first removed by the procedure outlined above. After the bonnet assembly has been removed from its engagement within the socket 150, ratchet detent pin 174 is again reversed. Seat removing and replacing tool 202 is then moved into engagement with tool 144 so that ribs 210 are received within slot 156 of the forked member. Socket 150 is then turned by rotating the bar 142 in a clockwise direction so as to effect the threaded engagement of the socket on the threads 206 on the upper end of tool body 204.

Ratchet detent pin 174 is then again reversed and the upper section of the housing is threadedly engaged within the gate valve outlet 116 in the manner described above. After the two sections of the housing have been engaged in pressure-tight relationship, gate 118 is opened and the tool 202 is lowered through the open gate valve and into the valve body through the opening 34 thereof. The wrench portion 214 of the valve seat tool is then manipulated into the corresponding internal face of the valve seat until balls 220 are in engagement below the lower end thereof, as shown in Figure 4. The bar 142 may then be rotated in a counter-clockwise direction, as viewed from above, until the valve seat is released from its threaded engagement within the valve body. The bar with the valve seat attached to the lower end thereof is then raised until the latter is disposed above the gate 118 of the gate valve. The gate valve is then closed and the upper section of the machine removed in the manner described above. To replace the valve seat, the reverse of the above procedure is carried out.

It is to be understood, however, that the form of the invention herewith shown and described is to be taken as the preferred embodiment of the same, and that various changes may be made without departing from the spirit of the invention or the scope of the appended claims.

We claim:

1. Apparatus for removing a threadedly mounted bonnet from a valve body while the latter is connected to a source of fluid pressure comprising: a barrel assembly adapted to be secured at its lower end in pressure-tight relation to a valve body in surrounding relation to a bonnet; a bar mounted for rotational and rectilineal motion in a bore formed in said barrel assembly; bonnet lifting means disposed within said barrel assembly and operatively associated with the lower end of said bar for engaging a bonnet upon rotation of said bar in one direction, bonnet turning means disposed within said barrel assembly and operatively associated with the lower end of said bar for engaging a bonnet upon substantial downward rectilinear movement of said bar, said lifting and turning means being relatively rotatable; and ratchet means operatively connected between said lifting and said turning means for restraining relative rotation therebetween to one direction only so that said lifting means may be engaged with a bonnet independent of said turning means and a bonnet may be turned and lifted after engagement by movement of the turning means and lifting means together.

2. Apparatus as defined in claim 1 wherein said lifting means comprises a member rigidly secured to the lower end of said bar and having an interiorly threaded socket on the lower end thereof.

3. Apparatus as defined in claim 2 wherein said turning means comprises a member rotatably mounted with respect to said socketed member and having a wrench portion extending forwardly of said socket.

4. A machine for use with a fire valve including a valve body having an inlet, an outlet, a valve seat between the inlet and outlet, an opening opposite the valve seat, and exterior threads surrounding the opening, a bonnet threadedly mounted within the opening having its upper end exteriorly threaded and a non-circular portion disposed therebelow, a valve stem carried by the bonnet, and a valve member connected with the lower end of the valve stem for engaging the valve seat, said machine being employed for removing the bonnet while the valve body is connected to a source of fluid pressure, and comprising: a barrel assembly having its lower end interiorly threaded; a bar mounted for rotational and rectilineal movement in a bore formed in said barrel assembly; an interiorly threaded socket rigidly mounted on the lower end of said bar; a wrench member rotatably carried by said bar; and ratchet means operatively connected between said bar and said member.

5. A machine for use with a fire valve including a valve body having an inlet, an outlet, valve seat threads between said inlet and outlet, an opening opposite the valve seat threads, and exterior threads surrounding the opening, a valve seat insert threadedly mounted within the valve seat threads and having angular faces formed on the interior thereof, a bonnet threadedly mounted within the opening, the bonnet having exterior threads formed at its upper end and a non-circular portion disposed therebelow, a valve stem carried by the bonnet, and a valve member connected with the lower end of the valve stem for engaging the valve seat insert, said machine being employed for removing the bonnet and the valve seat insert while the valve body is connected to a source of fluid pressure, said machine comprising: a barrel assembly having its lower end interiorly threaded; a bar mounted for rotational and rectilineal movement in a bore formed in said barrel assembly; an interiorly threaded socket rigidly mounted on the lower end of said bar; a wrench member rotatably carried by said bar; ratchet means operatively connected between said bar and said wrench member; and a tool body having one end threadedly engageable within said socket, a non-circular intermediate portion engageable by said wrench member, and an angularly faced head on its other end.

6. In a machine of the type described, an elongated member having means extending upwardly from the lower end thereof for receiving the upper end of a valve stem, an interiorly threaded socket on the lower end of said elongated member for engaging the upper threaded end of a valve bonnet to lift the same, an annular member rotatably mounted on said elongated member and having means for engaging the bonnet to turn the same, and ratchet means operatively connected between said annular member and said elongated member.

7. In a machine of the type described, an elongated member having a bore extending upwardly from the lower end thereof, an interiorly threaded socket on the lower end of said elongated member, an annular member rotatably mounted on said elongated member and having slots extending upwardly from the lower end thereof, ratchet means operatively connected between said annular member and said elongated member, a tool body having its upper end threadedly engaged within said socket, ribs extending outwardly from the central portion of said body engaged within said slots, and an angularly faced head on the lower end of said body for engaging a valve seat insert.

8. A tool operable through an enclosed housing, attachable fluid-tight to a valve in surrounding relation to its bonnet which is threadedly engaged with the body of the valve, for removing and replacing the bonnet while the valve is in service and without the escape of fluid from the valve to the atmosphere, the bonnet having thread means and noncircular means of larger transverse dimension both engageable by the tool, comprising: a rotatable and axially movable bar having an interiorly threaded socket in one end thereof; a member swivelly mounted on said one bar end and projecting forwardly thereof, said member having adjacent its forward end a noncircular wrench portion; ratchet means interconnecting said bar and member for locking said bar and member against relative rotation therebetween selectively in either direction; and a seat-removing attachment having a threaded end engageable in said socket and an intermediate non-circular portion engageable by said wrench portion, the other end of said attachment having a non-circular wrench portion and radially outwardly projecting detent means.

9. A tool operable through an enclosed housing, attachable fluid-tight to a valve in surrounding relation to its bonnet which is threadedly engaged with the body of the valve, for removing and replacing the bonnet while the valve is in service and without escape of fluid from the valve to the atmosphere, the bonnet having thread means and non-circular means of larger transverse dimension both engageable by the tool, comprising: a rotatable and axially movable bar having an interiorly threaded socket in one end thereof for detachable engagement with a thread means on a valve bonnet to move the latter axially; a member swivelly mounted on said one bar end and projecting forwardly thereof, said member having adjacent its forward end a noncircular wrench portion for detachable engagement with a non-circular means on a valve bonnet to rotate the latter; and ratchet means interconnecting said bar and member for locking said bar and member against relative rotation therebetween selectively in either direction.

10. The combination of a fire valve and a tool-inserting machine having a pressure-tight chamber operable to remove and replace parts of said valve while the latter is connected to a source of fluid pressure and without escape of fluid under pressure to the atmosphere comprising: a valve body having an inlet, an outlet, a valve seat between said inlet and outlet, and an opening opposite said valve seat; means engageable with said body for selectively opening or closing said outlet; a bonnet removably secured to said body and closing said opening; a valve stem carried by said bonnet; a valve member connected with the lower end of said valve stem for engaging said valve seat; means on said valve body disposed around said opening outwardly of the periphery of said bonnet for receiving one end of said machine so that the latter can be detachably secured in pressure-tight engagement with said valve body in surrounding relation to said bonnet; and means on said bonnet detachably engageable by a tool of said machine for releasing the securement of said bonnet within said opening and to move said bonnet, together with said valve stem and said valve member, outwardly from said valve body into said machine chamber when said outlet is closed, said machine including a valve for sealing off communication between said machine chamber and the interior of said valve body when said bonnet is moved into said chamber.

11. A fire valve as defined in claim 10 wherein said tool engageable means comprises exterior threads formed on the upper end of said bonnet and non-circular means on said bonnet below said exterior threads.

12. The combination of a fire valve and a pressure-tight tool-inserting machine detachably connectible to said valve and operable to remove and replace parts thereof while the same is connected to a source of fluid pressure comprising: a valve body having an inlet, an outlet, a ring-shaped valve seat removably mounted in said body between said inlet and outlet, and an opening opposite said valve seat through which the latter is removable; a bonnet removably secured within said opening; a valve stem carried by said bonnet; a valve member connected with the lower end of said valve stem for engaging said valve seat; means on said valve body disposed around said opening outwardly of the periphery of said bonnet for receiving one end of said machine so that the latter may be detachably secured in pressure-tight engagement with said valve body in surrounding relation to said bonnet, said machine having a bonnet-removing tool; means on said bonnet detachably engageable by said tool for releasing the securement of said bonnet within said opening and to move said bonnet, together with said valve stem and said valve member, outwardly from said valve body, said machine also having a seat-removing tool; and means on said valve seat detachably engageable by said seat-removing tool for releasing the securement of said valve seat within said valve body and to move said valve seat outwardly from said body.

13. In combination: a valve body having an inlet, an outlet, a valve seat between said inlet and outlet, and a threaded opening opposite said valve seat; means engageable with said body for selectively opening or closing said outlet; a bonnet removably threaded to said body and closing said opening; a valve stem carried by said bonnet; a valve member connected with the lower end of said stem for engaging said seat; an enclosed tool-inserting machine having a pressure-tight chamber and a bonnet-removing tool; means on said valve body disposed outwardly of the periphery of said bonnet for attaching one end of said machine in pressure-tight engagement with said body; means on said bonnet engageable by said tool for turning said bonnet within said opening to release the same and to remove said bonnet, together with said valve stem and valve member outwardly of said body and into said chamber by means of said valve tool while said outlet is closed and said machine serves to confine the fluid pressure within said valve body; and valve means associated with said machine for sealing off communication between the interior of said valve body and said chamber when said bonnet is moved into said chamber.

14. In combination: a valve body having an inlet, an outlet, a ring-shaped valve seat threadedly mounted therein between said inlet and outlet, and a threaded opening opposite said valve seat; a bonnet removably threaded within said opening; a valve stem carried by said bonnet; a valve member connected with the lower end of said valve stem for engaging said valve seat; a tool-inserting machine having a bonnet-removing tool and a seat-removing tool; means on said valve body disposed outwardly of the periphery of said bonnet for attaching one end of said machine in pressure-tight engagement with said valve body; means on said bonnet for engagement by said bonnet-removing tool to turn said bonnet within said opening to release the same and to move said bonnet, together with said valve stem and valve member, outwardly from said valve body by means of said bonnet-removing tool while said machine serves to confine the fluid pressure within said valve body; and means on said valve seat for engagement by said valve seat-removing tool to turn said valve seat in said valve body to release the same and to move said valve seat outwardly of the valve body by means of said valve-seat removing tool after said bonnet, said valve stem, and said valve member have been removed.

15. The combination of a fire valve and a pressure-tight tool-inserting machine having a barrel assembly interiorly threaded at its lower end, a bar mounted for rotational and rectilineal movement in a bore formed in said barrel assembly, an interiorly threaded socket rigidly mounted on the lower end of said bar, a socket wrench member rotatably carried by said bar, ratchet means operatively connected by the said socket and said wrench member, a tool body having its upper end threadedly engageable within said socket, a non-circular portion below said upper end engageable by said wrench, and an angular faced head on the lower end of said body below said non-circular portion, said fire valve comprising a valve body having an inlet, an outlet, valve seat threads formed between said inlet and outlet, an opening opposite said valve seat threads, and exterior threads surrounding said opening for engaging the interiorly threaded lower end of said barrel assembly to detachably secure the latter to said valve, a valve seat insert threadedly mounted within said valve seat threads, removable through said opening, and having angular interior faces for engaging said angular faces, a bonnet threadedly mounted within said opening, said bonnet having exterior threads formed at its upper end for engaging said interiorly threaded socket and a non-circular portion disposed below said threads for engaging within said wrench member, a valve stem carried by said bonnet, and a valve member connected with the lower end of said valve stem for engaging said valve seat insert.

16. A fire valve arranged to cooperate with a pressure-tight machine through which tools may be manipulated in order to remove and replace a removable valve seat of the valve while the latter is in service without escape of water to the atmosphere, comprising: a valve body having an inlet adapted to be connected to a stand pipe, an outlet adapted to have a hose detachably connected thereto, and a ported partition separating said inlet and said outlet; means engageable with said body for selectively opening or closing said outlet; a removable annular valve seat threadedly engaged within the port in said partition and having angular interior faces, said body having an opening aligned with said seat and through which the latter is removable; a valve bonnet threadedly engaged within and removably closing said opening; a valve member movably carried by said bonnet for cooperation with said seat to control flow therethrough; exterior thread means and non-circular means on said bonnet outwardly of said body, both of said means being detachably engageable by a tool to both rotate and linearly move said bonnet; and attaching means on said valve body about said opening for detachably connecting a pressure-tight machine to said body.

17. The structure defined in claim 16 in which the attaching means comprises an exterior thread.

18. The structure defined in claim 16 in which the non-circular means is disposed between the thread means and the body and is of a maximum radial dimension greater than said thread means.

19. The structure defined in claim 16 in which the means for opening or closing the outlet includes an exteriorly threaded boss on the body surrounding said outlet and an interiorly threaded cap engageable with said boss.

20. In a fire valve construction, a valve body having an inlet adapted to be connected to a stand pipe, an outlet adapted to have a hose detachably connected thereto, a ported partition separating said inlet and said outlet, a ring-shaped valve seat removably mounted in the port in said partition, and a threaded opening opposite said valve seat through which said seat is removable; means engageable with said body for selectively opening or closing said outlet; a bonnet threadedly mounted to said body and closing said opening and having a threaded bore extending therethrough; a valve stem mounted in said bore; a valve member secured to the lower end of said stem for cooperating with said seat; exterior screw threads on said body in surrounding relation to said opening; a non-circular portion on said bonnet above said opening; exterior screw threads on the upper end of said bonnet above said non-circular portion; and angular surfaces on the interior of said ring-shaped valve seat.

References Cited in the file of this patent

UNITED STATES PATENTS

| | | |
|---|---|---|
| 143,683 | Faxon | Oct. 14, 1873 |
| 590,269 | Martin | Sept. 21, 1897 |
| 794,808 | Lunken | July 18, 1905 |
| 1,715,395 | Walker | June 4, 1929 |
| 1,743,413 | Weatherhead | Jan. 14, 1930 |
| 1,885,593 | Downer | Nov. 1, 1932 |
| 1,996,345 | Mueller | Apr. 2, 1935 |
| 2,078,782 | Storey | Apr. 27, 1937 |
| 2,084,200 | Karlson | June 15, 1937 |
| 2,237,476 | Cline | Apr. 8, 1941 |
| 2,583,291 | Beem | Jan. 22, 1952 |
| 2,640,492 | Sawicki | June 2, 1953 |
| 2,655,339 | Smith | Oct. 13, 1953 |
| 2,696,966 | Mueller et al. | Dec. 14, 1954 |
| 2,740,606 | Koenig | Apr. 3, 1956 |
| 2,744,310 | Gould | May 8, 1956 |
| 2,804,279 | Gould | Aug. 27, 1957 |

FOREIGN PATENTS

| | | |
|---|---|---|
| 515,619 | Italy | Feb. 16, 1955 |